(12) United States Patent
Fujimoto et al.

(10) Patent No.: US 7,033,308 B2
(45) Date of Patent: Apr. 25, 2006

(54) AUTOMATIC TOOL CHANGING DEVICE FOR MACHINE TOOL

(75) Inventors: Akihiko Fujimoto, Yamanashi (JP); Naoki Sato, Yamanashi (JP); Norio Watanabe, Fujiyoshida (JP)

(73) Assignee: Fanuc LTD, Yamanashi (JP)

( * ) Notice: Subject to any disclaimer, the term of this patent is extended or adjusted under 35 U.S.C. 154(b) by 112 days.

(21) Appl. No.: 10/870,002

(22) Filed: Jun. 18, 2004

(65) Prior Publication Data

US 2005/0009679 A1 Jan. 13, 2005

(30) Foreign Application Priority Data

Jul. 7, 2003 (JP) .............................. 2003-192976

(51) Int. Cl.
*B23Q 3/157* (2006.01)
*B23Q 11/00* (2006.01)
*B23Q 11/10* (2006.01)
*B23Q 11/12* (2006.01)

(52) U.S. Cl. .............................. 483/13; 483/2; 483/54; 483/56; 409/137; 409/134; 409/135; 408/61; 15/415.1

(58) Field of Classification Search ................. 483/13, 483/1–2, 39, 31, 56, 54; 409/137, 134, 135–136, 409/231–232; 408/61, 56, 60; 15/322, 354, 15/300.1, 405, 415.1
See application file for complete search history.

(56) References Cited

U.S. PATENT DOCUMENTS

| | | | | |
|---|---|---|---|---|
| 4,468,834 A | * | 9/1984 | David | 15/246 |
| 4,525,918 A | * | 7/1985 | Puritz | 483/13 |
| 4,955,127 A | * | 9/1990 | Suda et al. | 483/54 |
| 5,020,210 A | * | 6/1991 | Fujimoto | 483/54 |
| 5,165,133 A | * | 11/1992 | Armbruster | 15/97.1 |
| 5,353,823 A | * | 10/1994 | Peter | 134/186 |
| 5,499,963 A | * | 3/1996 | Fujimoto et al. | 483/56 |
| 5,782,592 A | * | 7/1998 | Row et al. | 409/137 |
| 5,895,182 A | * | 4/1999 | Hayashi et al. | 409/137 |
| 6,059,702 A | * | 5/2000 | Winkler et al. | 483/13 |
| 6,409,641 B1 | * | 6/2002 | Hashimoto | 483/13 |
| 2005/0032615 A1 | * | 2/2005 | Sato et al. | 483/13 |

FOREIGN PATENT DOCUMENTS

| | | | |
|---|---|---|---|
| CH | 615105 A5 | * | 1/1980 |
| DE | 4302530 A1 | * | 8/1993 |

(Continued)

*Primary Examiner*—Erica Cadugan
(74) *Attorney, Agent, or Firm*—Staas & Halsey LLP

(57) ABSTRACT

An automatic tool changing device capable of cleaning a contact surface of a spindle, which is to be in contact with a tool holder, with a simple structure. The device includes a turret having a plurality of grippers on its outer circumference and holding the tool holder by means of the grippers. At the time of tool change, the grippers grip and pull out the tool holder fixed to the spindle. Rotation of the spindle causes the turret to rotate through a spindle gear, a turret gear, and a decelerating device, to thereby select a tool. At this moment, a coolant is spouted from a nozzle portion of a manifold toward a spindle taper hole in which the tool holder is interfitted and washes the taper hole. Due to the rotation of the spindle, the coolant is spouted onto the whole circumference of the taper hole, and the surface to be in contact with the tool holder is surely washed. Therefore, it is possible to perform the cleaning with a simple structure in which the nozzle portion is arranged near the spindle without machining the spindle and the tool holder.

4 Claims, 3 Drawing Sheets

FOREIGN PATENT DOCUMENTS

| | | |
|---|---|---|
| EP | 0 377 049 | 8/1992 |
| EP | 0 855 245 | 7/1998 |
| EP | 1 044 748 | 10/2000 |
| JP | 47-46705 | 11/1972 |
| JP | 52-49579 | 12/1977 |
| JP | 6-218646 | 8/1994 |
| JP | 9-011078 | 1/1997 |
| JP | 9-29577 | 2/1997 |
| JP | 10-235535 A * | 9/1998 |
| JP | 2001-310229 A * | 11/2001 |
| JP | 2002-292539 A * | 10/2002 |

* cited by examiner

AUTOMATIC TOOL CHANGING DEVICE FOR MACHINE TOOL

BACKGROUND OF THE INVENTION

1. Field of the Invention

The present invention relates to an automatic tool changing device for a machine tool.

2. Description of the Related Art

In case that a tool is changed, machining accuracy on a workpiece is maintained by properly fitting a tool holder onto the spindle of a machine tool. Occasionally, however, the tool holder may not be fitted to the spindle properly because of foreign matter, such as swarf, adhered to contact surfaces of the spindle and the tool holder, which affects the machining accuracy. For this reason, there has been employed a method of cleaning a surface of a taper hole of the spindle and/or a tapered portion of the tool holder as the contact surface is cleaned by removing the swarf and the like using fluid, such as air in an operation of a tool change.

There is a known method in which an air nozzle is opened in the taper hole of the spindle to which the tapered portion of the tool holder is fitted. When the tool holder is detached from the taper hole of the spindle or when a new tool is fitted to the spindle, the pressurized air is supplied from an air supply onto the contact surfaces of the tool holder and the spindle taper hole through an air hole and the air nozzle that are provided to the spindle. Thus, swarf and the like adhered to the tapered portions of the contact surfaces of the tool holder and the spindle is removed and cleaned up by the air (see JP 52-49579B, JP 47-46705B and JP 2503170B).

The cleaning methods as described in the above publications, however, require an air passage to be provided to the spindle to blow air out from the spindle taper hole provided thereto through the air passage. The necessity for forming the air passage in the spindle complicates fabrication of the spindle.

There is another known method in which the operation similar to the tool change is performed, and a cleaning tool, such as a brush, held by a tool changing arm is pressed towards the spindle taper hole to clean the spindle taper hole (see JP 9-29577A). In this method using the extra cleaning tool, such extra leaning tool needs to be prepared. At the same time, it is also required to carry out the cleaning operation by pressing the cleaning tool towards the spindle taper hole at the time of tool change, and thereafter to exchange a new tool with the cleaning tool on the tool changing arm. This entails an additional cleaning operation for each the tool change operation, so that it accordingly takes a long time to complete the tool change, thereby lowering operation efficiency.

There is known a tool changing device in which an air passage is formed in a tool holder with an air discharge opening on a contact surface of the tool holder to be in contact with a spindle taper hole, and a tool changing arm is provided with tool gripping sections in a twin form from JP 3203598B. At the time of tool change, a tool holder attached to the spindle and a tool holder attached to a magazine pot are gripped by the two tool-gripping sections of the exchange arm. When the tool holder is held by the tool gripping section, an air passage formed at the tool changing arm and the air passage of the tool holder communicates with each other to flow air. After starting of pulling out the tool holder, the air blows out from a gap between the spindle taper hole and the tapered portion of the tool holder and sweeps away dust to clean. The magazine pot is cleaned up in the same manner. When a new tool holder is to be attached to the spindle, the cleaning is carried out in a similar way. The cleaning method described in this document requires an air passage formed in the tool holder, which makes the tool holder costly. Furthermore, since the existing tool holders have no air passage, the aforementioned method cannot be applied to the tool change using existing tool holders.

In addition, there is known an automatic tool changing device in which tool allocating means allocates a tool holder to be attached to the spindle among a plurality of tool holders held by a turret by rotating the turret by transmitting rotation of the spindle to the turret through a speed reducer, and the tool holder is fitted to a tapered hole of the spindle using up-and-down motion of a spindle head, as disclosed in JP 2535479B.

SUMMARY OF THE INVENTION

The present invention provides an improvement in an automatic tool changing device as disclosed in JP 2535479B, which has tool allocating means for allocating a tool utilizing rotation of a spindle, to clean a contact face of the spindle to be in contact with a tool holder with a simple structure.

An automatic tool changing device of the present invention comprises: tool allocating means for allocating a tool holder to be attached to the spindle among a plurality of tool holders by utilizing a rotation of the spindle; and fluid spouting means for spouting fluid toward a contact surface of the spindle to be in contact with the tool holder from outside of the spindle while the tool allocating means is allocating the tool holder so as to clean the contact surface of the spindle entirely.

The spindle is rotated during the allocation of the tool by the tool allocating means, so that the fluid spouted from the fluid spouting means flushes and cleans the whole of the contact surface of the spindle.

The tool allocating means may allocate no tool holder and the fluid spouting means may spout fluid to the contact surface of the spindle with no tool holder attached while the spindle is rotated.

The fluid spouting means may include means for spouting fluid toward a contact surface of the tool holder to be in contact with the spindle, which is allocated to be attached to the spindle by the tool allocating means, to thereby clean the contact surface of the tool holder as well as the contact surface of the spindle.

The automatic tool changing device fluid spouting means may further comprise a distance sensor for measuring distance to a periphery of the tool holder attached to the spindle, and the fluid spouting means may include means for spouting fluid toward the periphery of the tool holder to be cleaned. With this arrangement, the distance between the distance sensor and the periphery of the tool holder is accurately measured to enable accurate detection of whether or not the tool holder is properly attached to the spindle.

DETAILED DESCRIPTION OF THE PREFERRED EMBODIMENTS

Figure 1:
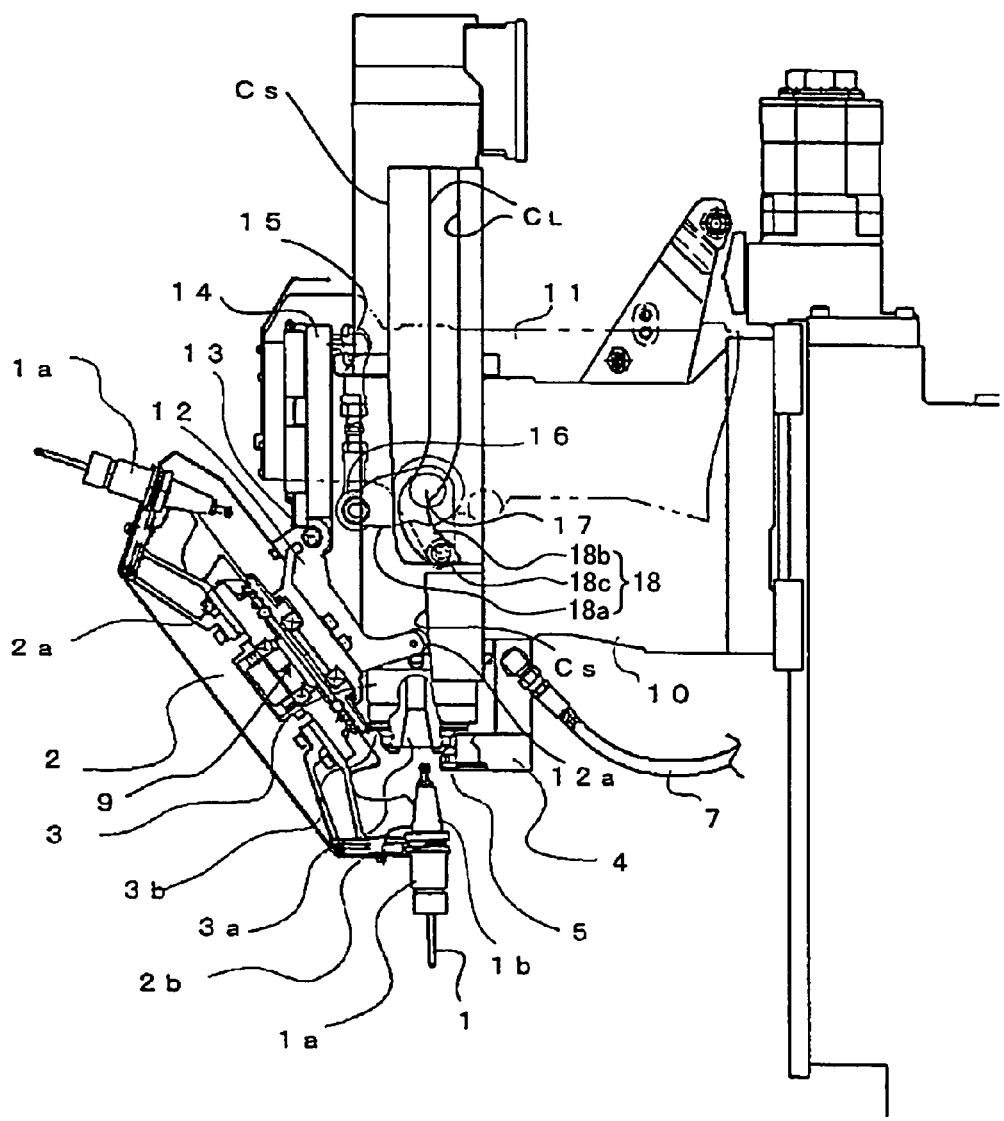
FIG. 1 is an explanatory view of a substantial part of one embodiment of an automatic tool changing device according to the present invention.

FIG. 1 is an explanatory view of a substantial part of one embodiment of an automatic tool changing device according to the present invention. The device of the embodiment is identical to one described in JP 2535479B, except that according to the embodiment, a manifold 4 and a nozzle portion 5 serving as fluid spouting means, and a pipe 7 for supplying fluid, such as a coolant, to the manifold 4 as the fluid spouting means are added to the automatic tool changing device disclosed in the above publication. First, a summary of a known part of the automatic tool changing device will be described.

The automatic tool changing device according to the embodiment comprises an arm member 11, a turret 2 having a plurality of grippers 2b on an outer circumference thereof and holding a tool holder 1a by means of the grippers 2b, a crank 12 secured onto a back face of the turret 2, first and second cams Cs, CL fastened to a spindle head, a swing roller 12a provided to the crank 12, which swings the turret 2 in consort with the first cam Cs, a lift slider 14 coupled to the crank 12 by a rotary shaft 13, a lift link 15 coupled to the lift slider 14, a lift lever 18 having two arm members 18a, 18b fastened to the lift link 15 with a pin 16, which rotate around a rotary shaft 17, a lift roller 18c provided to the arm member 18b of the lift lever 18 and engaged with the second cam CL, a turret gear 2a disposed in the turret 2 and engaged with a spindle gear 3b provided to a spindle 3, a speed reducer 9 provided to the turret 2, which reduces and transmits rotation of the turret gear 2a to the turret 2 to rotate the turret 2, and so on. The turret 2, the turret gear 2a and the speed reducer 9 compose tool allocating means.

Based on a tool change command, a spindle head 10 moves upward and stops at a Z-axial original point position, and orientation of the spindle is performed at the position. After the orientation is completed, the spindle head 10 moves up again. Due to this ascending motion of the spindle head 10, the swing roller 12a and the first cam Cs cause the turret 2 to swing counterclockwise, and the grippers 2b arranged on the outer circumference of the turret 2 are engaged with grooves of the tool holder 1a of a tool 1 attached to the spindle 3. Further ascension of the spindle head 10 pulls the tool holder 1a out of the spindle 3 as illustrated in FIG. 1. When the ascending motion of the spindle head 10 is finished, the spindle gear 3b and the turret gear 2a are engaged with each other. In this state, the spindle 3 is rotated to implement the allocation of a desired tool 1. In other words, the spindle gear 3b rotates with the rotation of the spindle and rotates the turret gear 2a engaged with the spindle gear 3b. The speed reducer 9 reduces a speed of the rotation to rotate the turret 2, thereby determining a turret position for obtaining the desired tool (tool holder) 1. FIG. 1 shows a state in which the desired tool holder 1a is allocated. After the desired tool holder 1a is selected in the aforementioned manner, the spindle head 10 moves downward, which releases the engagement between the spindle gear 3b and the turret gear 2a, fits the tool holder 1a to a spindle taper hole 3a, and causes the grippers 2b to retreat from the tool holder 1a. Due to the descending motion of the spindle head 10, operations are implemented in inverse order to the ascending motion of the spindle head 10.

The aforementioned are about a known structure of the automatic tool changing device and a known tool change operation, as described in detail in JP 2535479B, the disclosure of which is hereby incorporated by reference. The present invention is so designed that fluid spouting means is provided to wash the spindle taper hole 3a functioning as an interfitting part of the tool holder 1a and the spindle 3 at the time of tool change. According to the embodiment shown in FIG. 1, there is provided the manifold 4 having the nozzle portion 5 that constitutes the fluid spouting means attached to the spindle head 10. A coolant supplied from the nozzle portion 5 through the pipe 7 is spouted onto a contact surface of the spindle taper hole 3a, which is to be in contact with a tapered portion 1b of the tool holder 1a, to thereby clean the contact surface, and wash the tapered portion 1b of the tool holder 1a with the coolant spouted from the nozzle portion 5.

Figure 2:
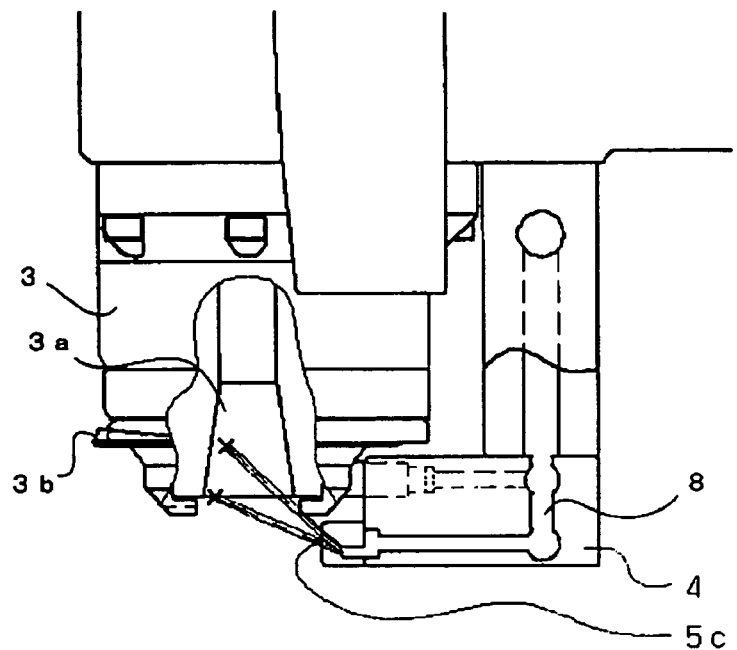
FIG. 2 is a side view of a tip end of a spindle, a manifold, and a nozzle portion according to the embodiment.
Figure 3:
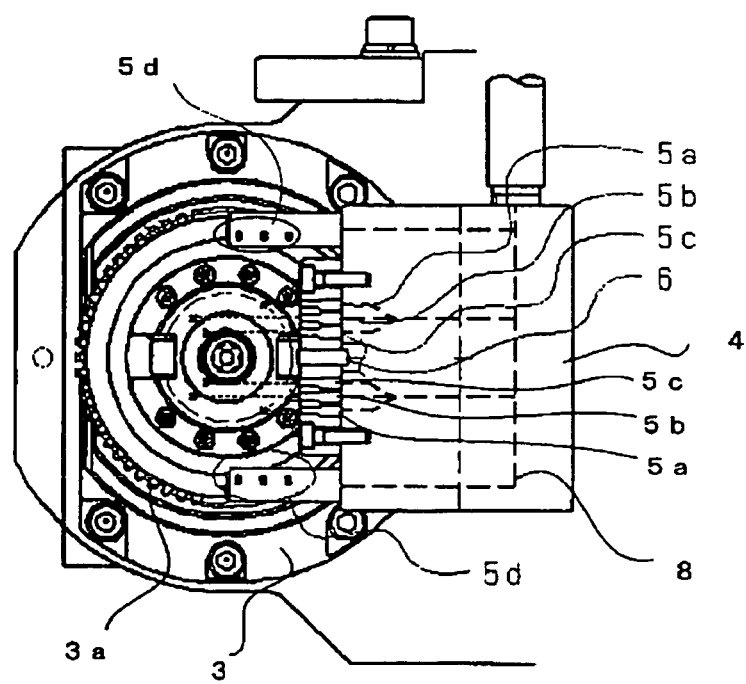
FIG. 3 is a bottom plan view facing into a bottom of FIG. 2.

FIG. 2 is a side view of a tip end of the spindle 3, the manifold 4 and the nozzle portion 5, and FIG. 3 is a bottom view facing into a bottom of FIG. 2. According to this embodiment, the nozzle portion 5 of the manifold 4 comprises a pair of spindle taper hole-washing nozzles 5c for washing the contact surface of the spindle taper hole 3a, which is to be in contact with the tapered portion 1b of the tool holder 1a, a pair of spindle end face-washing nozzles 5b for washing an end face of the spindle for the use of double fit tooling, a distance sensor 6 for detecting an orientation of the tool holder 1a attached to the spindle 3, a pair of tool holder detection face-washing nozzles. 5a for washing a detection face, i.e. an outer periphery of the tool holder 1a, which is subjected to measurement using the distance sensor 6, and a pair of tool holder-washing nozzles 5d for washing the tapered portion 1b of the tool holder 1a.

Connected to each of the nozzles 5a, 5b, 5c and 5d is a flow channel opening 8 for the coolant supplied through the pipe 7, to thereby supply the coolant to each nozzle. As shown in FIGS. 2 and 3, directions of the nozzles 5c are set such that the coolant spouted from the spindle taper hole-washing nozzles 5c strikes the surface of the spindle taper hole 3a, which is to be in contact with the tapered portion 1b of the tool holder 1a. Directions of the spindle end face-washing nozzles 5b are so determined that the spouted coolant strikes the end face of the spindle 3, with which an end face of the tool holder 1a is to be in contact.

Figure 4:
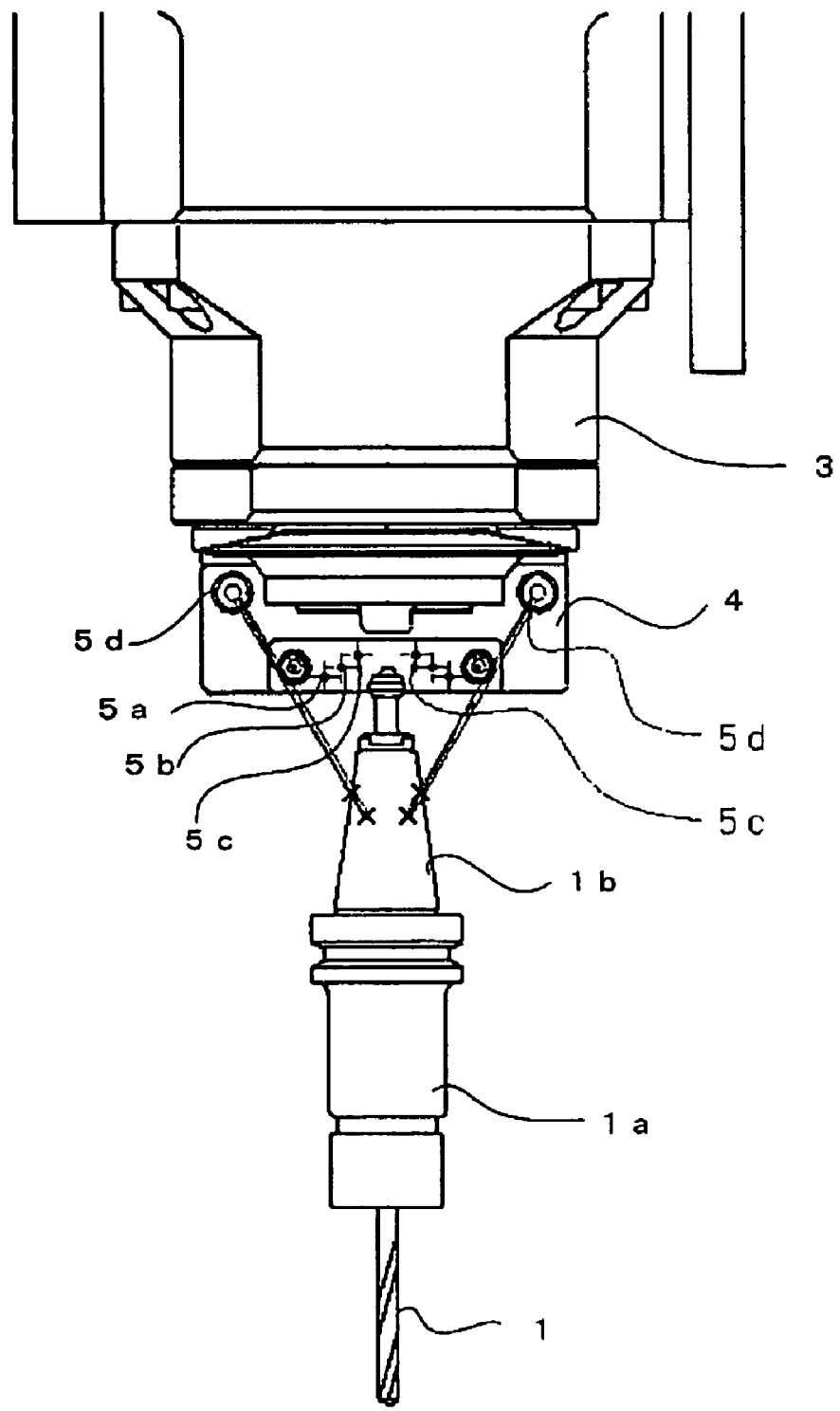
FIG. 4 is an explanatory view for explaining a state in which a tapered portion of a tool holder is washed according to the embodiment.

Directions of the tool holder-washing nozzles 5d, 5d are, as shown in FIG. 4, adjusted such that the spouted coolant strikes the tapered portion 1b of the tool holder 1a in a state where the tool holder 1a is pulled out of the spindle 3 and in a state right before the tool holder 1a is interfitted in the taper hole 3a of the spindle 3.

At a tool change command, the spindle head 10 moves upward, and as stated, the positioning of the spindle 3 and the shifting thereof to the Z-axial original point are carried out. The spindle head 10 further ascends to cause the grippers 2b arranged on the outer circumference of the turret 2 to hold the tool holder 1a attached to the spindle 3. The tool holder 1a is pulled out by being unclamped, and the spindle gear 3b and the turret gear 2a are engaged with each other. Subsequently, in order to select the tool holder 1a to be attached to the spindle 3, the tool selecting operation is begun by rotating the spindle 3, and the discharge of the coolant is started.

The rotation of the spindle 3 causes the turret 2 to start rotating through the spindle gear 3b, the turret gear 2a and the speed reducer 9. Since the turret 2 is rotated at a reduced speed with respect to the rotation of the spindle 3, even if a tool is selected by rotation of a tool selection minimum unit of the turret 2, the spindle 3 makes one or more rotations. Simultaneously with the rotation of the spindle 3, the coolant is spouted from each nozzle, and the coolant spouted from the spindle taper hole-washing nozzles 5c and the spindle end face-washing nozzles 5b then strikes a tapered face of the spindle taper hole 3a and the end face of the spindle over the whole circumference, thereby washing and cleaning the faces.

When the spindle 3 is rotated for tool selection, the coolant is supplied to each nozzle at the same time. Thus, with respect to the tool holder 1a pulled out of the spindle 3 and the tool holder 1a that is selected but not yet inserted in the spindle taper hole 3a, the coolant is spouted toward the tapered portions 1b of the tool holders 1a as illustrated in FIG. 4, to thereby wash and clean the tapered portions 1b. In other words, the tapered portions 1b of the tool holders 1a are washed with the coolant to remove swarf and the like before being accommodated in the turret 2 and before being attached to the spindle 3.

Once the tool 1 is allocated, the rotation of the spindle 3 is halted, and the spindle head 10 is made to move downward to release the engagement between the spindle gear 3b and the turret gear 2a. Furthermore, the tool holder 1a is interfitted in the spindle taper hole 3a to be clamped. The supply of the coolant is stopped at this point. Thereafter, the grippers 2b retreat from the tool holder 1a, and the tool change operation is completed.

By taking advantage of rotation of the spindle 3 for tool selection before the step of selecting and attaching a new tool 1 to the spindle 3 as described above, the coolant is spouted and strikes the contact surface of the spindle taper hole 3a, which is to be in contact with the tapered portion 1b of the tool holder 1a and the end face of the spindle, which is put together with the end face of the tool holder 1a, over the whole circumference, to thereby wash these faces. In addition, the tapered portion 1b of the tool holder 1a is washed by spouting the coolant onto the tapered face of the tool holder 1a in the process of the tool change operation, more specifically in the step of pulling the tool holder 1a out of the spindle 3 and of attaching the tool holder 1a to the spindle 3.

As a result, the spindle 3 and the tool holder 1a are fitted to each other after the spindle taper hole 3a serving as the contact surface of the spindle 3 and the tool holder 1a and the surface of the tapered portion 1b of the tool holder 1a are washed and cleaned by removing a foreign object, such as swarf, with the coolant, thereby resulting in proper attachment of the tool holder 1a to the spindle 3.

When the tool holder 1a is attached to (and detached from) the spindle 3, the coolant spouted from the tool holder detection face-washing nozzles 5a also washes an outer periphery of the tool holder 1a, which is subjected to the measurement using the distance sensor 6. On this account, at the time the spindle 3 is caused to make one rotation, and the distance between the distance sensor 6 and the detection face of the tool holder 1a is accurately measured by the distance sensor 6 after the tool holder 1a is attached to the spindle 3, the measurement detection face has been washed, so that there is no swarf and the like attached thereto, which enables accurate measurement. This makes it possible to detect whether the tool holder 1a is properly interfitted in the spindle taper hole 3a. If the fitting of the tool holder 1a to the spindle taper hole 3a is not properly carried out, the distance to the tool holder 1a which is measured by the distance sensor 6 varies according to the rotation of the spindle 3. Therefore, based on a variation value, it is possible to determine if the tool holder 1a is properly attached to the spindle 3.

According to the above embodiment, the taper hole 3a of the spindle 3, which serves as the contact surface of the spindle 3 and the tool holder 1a, and the tapered portion 1b of the tool holder 1a are washed and cleaned with the coolant at the time of tool change. However, the spindle taper hole and the spindle end face may be washed and cleaned by causing the turret 2 to carry out the tool change operation after selecting a place having no tool to create a state in which the tool holder 1a is not fitted in the taper hole 3a of the spindle 3, rotating the spindle 3 at a high speed, and simultaneously spouting the coolant from the spindle taper hole-washing nozzles 5c and the spindle end face-washing nozzles 5b. In this case, the high-speed rotation of the spindle produces a velocity differential between the coolant and the spindle, and high washing property can be achieved by the velocity differential.

Although in each of the aforementioned embodiments, the coolant is used as means for washing and cleaning the spindle taper hole 3a and the tool holder 1a, another fluid or pressurized air may be used in place of the coolant.

According to the present invention, in the automatic tool changing device having the tool allocating means that performs tool selection by utilizing the rotation of the spindle, the fluid spouting means is disposed in the vicinity of the spindle, and the fluid is spouted onto the contact surface of the spindle that rotates during the tool selection, which is to be in contact with the tool holder. Thus, the spouted fluid strikes the entire contact surface, to thereby remove a foreign object, such as swarf, adhered to the surface, and wash and clean the surface. Only by providing the fluid spouting means, it is possible to efficiently wash and clean the contact surfaces of the spindle and the tool holder with a simple and inexpensive structure.

Furthermore, since the spindle is rotated at a high speed with no tool holder attached to the spindle, and simultaneously the fluid is spouted from the fluid spouting means onto the surface of the spindle, with which the tool holder is to be in contact, the velocity differential between the spouted fluid and the spindle makes it possible to efficiently wash the surface of the spindle, with which the tool holder is to be in contact, and then to achieve high washing property.

Furthermore, it is also possible to wash the contact surface of the tool holder, which is to be in contact with the spindle, by spouting the fluid from the fluid spouting means. As a consequence, the contact surfaces of the spindle and the tool holder can be more reliably washed and cleaned.

What is claimed is:

1. An automatic tool changing device for a machine tool having a spindle to which a tool holder is attached, comprising:
   tool allocating means for allocating a tool holder to be attached to the spindle among a plurality of tool holders by utilizing a rotation of the spindle; and
   fluid spouting means for spouting fluid toward an entire contact surface of the spindle to be in contact with the tool holder from outside of the spindle while said tool allocating means is allocating the tool holder so as to clean the entire contact surface of the spindle.

2. An automatic tool changing device according to claim 1, wherein said tool allocating means allocates no tool holder, and said fluid spouting means spouts fluid to the contact surface of the spindle with no tool holder attached while the spindle is rotated.

3. An automatic tool changing device according to claim 1, wherein said fluid spouting means includes means for spouting fluid toward a contact surface of the tool holder to be in contact with the spindle, which is allocated to be attached to the spindle by said tool allocating means.

4. An automatic tool changing device according to claim 1, further comprising a distance sensor for measuring distance to a periphery of the tool holder attached to the spindle, wherein said fluid spouting means includes means for spouting fluid toward the periphery of the tool holder to be cleaned.

* * * * *